US008954814B2

(12) United States Patent
Mayrench et al.

(10) Patent No.: US 8,954,814 B2
(45) Date of Patent: *Feb. 10, 2015

(54) METHOD AND APPARATUS FOR DECODING

(71) Applicant: Marvell World Trade Ltd., St. Michael (BB)

(72) Inventors: Ronen Mayrench, Raanana (IL); Barak Ullman, Kiriat-Ono (IL); Moshe Haiut, Ramat Gan (IL); Shahar Fattal, Tel Aviv (IL)

(73) Assignee: Marvell World Trade Ltd., St. Michael (BB)

( * ) Notice: Subject to any disclaimer, the term of this patent is extended or adjusted under 35 U.S.C. 154(b) by 71 days.

This patent is subject to a terminal disclaimer.

(21) Appl. No.: 13/745,466

(22) Filed: Jan. 18, 2013

(65) Prior Publication Data
US 2013/0151920 A1 Jun. 13, 2013

Related U.S. Application Data

(63) Continuation of application No. 12/414,124, filed on Mar. 30, 2009, now Pat. No. 8,359,505.

(60) Provisional application No. 61/040,933, filed on Mar. 31, 2008.

(51) Int. Cl.
*G08C 25/02* (2006.01)
*H04L 1/18* (2006.01)
(Continued)

(52) U.S. Cl.
CPC ............... *H04L 1/08* (2013.01); *H04L 1/0053* (2013.01); *H04L 1/1816* (2013.01); *H04L 1/1845* (2013.01); *H04L 1/0061* (2013.01)
USPC .......................................... 714/748; 714/774

(58) Field of Classification Search
CPC ..... H04L 1/0053; H04L 1/0061; H04L 1/1845; H04L 1/1816; H04L 1/08
USPC .................................. 714/748, 749, 752, 774
See application file for complete search history.

(56) References Cited

U.S. PATENT DOCUMENTS 6,526,538 B1    2/2003  Hewitt
7,058,407 B2    6/2006  Chi et al.
(Continued)

FOREIGN PATENT DOCUMENTS

WO    WO 99/14885 A2     3/1999
WO    WO 2005/112328 A2  11/2005
WO    WO 2009/075899 A1   6/2009

OTHER PUBLICATIONS

Chinese Rejection Decision issued Apr. 9, 2013, in China Patent Application No. 200980112065.2 (with English translation).
(Continued)

*Primary Examiner* — Cynthia Britt

(57) ABSTRACT

Aspects of the disclosure can provide a method and an apparatus to decode a data stream based on multiple transmissions with efficient usages of storage and power resources. The method can include receiving a first plurality of encoded code blocks corresponding to a first transmission of a transport block, decoding the first plurality of encoded code blocks into decoded code blocks, error detecting the decoded code blocks, and storing a decoding history of the decoded code blocks. Further, the method can include receiving a second plurality of encoded code blocks corresponding to a retransmission of the transport block. The second plurality of encoded code blocks can map the first plurality of encoded code blocks, respectively. The method can selectively decode a subset of the second plurality of encoded code blocks based on the decoding history. In addition, the method can include storing soft bits for code blocks that failed decoding.

20 Claims, 4 Drawing Sheets

(51) Int. Cl.
*H04L 1/08* (2006.01)
*H04L 1/00* (2006.01)

(56) References Cited

U.S. PATENT DOCUMENTS

| | | | |
|---|---|---|---|
| 8,276,026 B2 * | 9/2012 | Jitsukawa et al. | 714/708 |
| 2003/0123409 A1 | 7/2003 | Kwak et al. | |
| 2009/0003377 A1 | 1/2009 | Andersson et al. | |
| 2009/0154392 A1 | 6/2009 | Park et al. | |
| 2011/0078529 A1 * | 3/2011 | Wu et al. | 714/748 |

OTHER PUBLICATIONS

International Preliminary Report on Patentability issued in International Patent Application No. PCT/IB2009/005764, mailed on Oct. 14, 2010.

International Search Report issued in International Patent Application No. PCT/IB2009/005764, mailed on Oct. 16, 2009.

Tao Shi; Lei Cao; "Interleaved and Dynamic Segment Selective Repeat-Based Turbo Coded Hybrid ARQ," Communications, Circuits and Systems Proceedings, 2006 International Conference on, vol. 2, No., pp. 726-730, Jun. 25-28, 2006.

Fugui Huang; Xiaoxin Vi; Tie Wang; , "Reliability-Based Selective Repeat Hybrid ARQ Protocol on Low Density Parity Check Codes," Artificial Reality and Telexistence—Workshops, 2006. ICAT '06. 16th International Conference on, vol., No., pp. 576-579, Nov. 29, 2006-Dec. 1, 2006.

Minjae Park; Byungjik Keum; Moohong Lee; Hwang Soo Lee;, "A Selective HARQ Scheme Operating based on Channel Conditions for High Speed Packet Data Transmission Systems," Personal, Indoor and Mobile Radio Communications, 2007. PIMRC 2007. IEEE 18th International Symposium on, vol., No., pp. 1-5, Sep. 3-7, 2007.

Assimi, A.-N.; Poulliat, C.; Fijalkow, I.; , "Packet combining for turbo-diversity in HARQ systems with integrated turboequalization," Turbo Codes and Related Topics, 2008 5th International Symposium on, vol., No., pp. 61-66, Sep. 1-5, 2008.

* cited by examiner

METHOD AND APPARATUS FOR DECODING

INCORPORATION BY REFERENCE

This application is a continuation of U.S. patent application Ser. No. 12/414,124, filed on Mar. 30, 2009, which claims the benefit of U.S. Provisional Application No. 61/040,933, "Efficient Architecture for Decoding Transport Block Composed of Concatenated Code Blocks" filed on Mar. 31, 2008, which is incorporated herein by reference in its entirety.

BACKGROUND

Wireless communication standards may use retransmission techniques to achieve reliable data transmission. For example, a long term evolution (LTE) standard may transmit data in the form of transport blocks. A transport block may include a plurality of code blocks. Should any code block be not properly received by a user equipment (UE), the entire transport block can be retransmitted. The UE may process, for example decode, the entire retransmitted transport block.

SUMMARY

Aspects of the disclosure can provide a method and an apparatus to decode a data stream based on multiple transmissions with efficient usages of storage and power resources.

When a user equipment (UE) fails to correctly decode a transport block, for example, a code block of the transport block is faultily decoded, the UE may transmit an NACK message. The NACK message may result in a retransmission of the entire transport block. However, upon receiving the re-transmitted transport block, only a portion of the transport block, which includes the faulty code block, is decoded by the UE. The UE can maintain a history of which code blocks are faulty. In order to save memory resources, the UE may allocate memory resources for the faulty code blocks, for example, for storing soft bits of the faulty code blocks, instead of storing soft bits of the entire transport block. By using the history of successfully/unsuccessfully decoded code blocks, decoding of code blocks that have already been successfully decoded can be avoided. In addition, the UE may have reduced number of memory accesses. Therefore, the UE may use external storage, instead of on-chip storage of a baseband chip. Ultimately, once the faulty code blocks are properly decoded, they can be concatenated with previously received and properly decoded code blocks.

The method for decoding can include receiving a first plurality of encoded code blocks corresponding to a first transmission of a transport block, decoding the first plurality of encoded code blocks into decoded code blocks, error detecting the decoded code blocks, and storing a decoding history of the decoded code blocks. Further, the method can include receiving a second plurality of encoded code blocks corresponding to a retransmission of the transport block. The second plurality of encoded code blocks can map the first plurality of encoded code blocks respectively. Then, the method can selectively decode a first subset of the second plurality of encoded code blocks, without decoding a second subset of the second plurality of encoded code blocks, based on the decoding history.

According to the disclosure, the second plurality of encoded code blocks can be identically encoded as the first plurality of encoded code blocks, or can be differently encoded from the first plurality of encoded code blocks.

To store the decoding history of the decoded code blocks, the method can include storing a bitmap corresponding to the error detection for the decoded code blocks.

To selectively decode the subset of the second plurality of encoded code blocks based on the decoding history, the method can include selecting an encoded code block from the second plurality of encoded code blocks if the decoding history indicates that decoding for the code block in previous transmissions fails.

Further, the method can include decoding a combination of the selected encoded code block and its correspondents from previous transmissions. More specifically, the method can include combining soft bits of the selected encoded code block with soft bits from previous transmissions, and decoding the combined soft bits into a decoded code block. Additionally, the method can include storing the combined soft bits if the decoded code block fails an error detecting test.

The method can also include error detecting the decoded code blocks of the first subset of the second plurality of encoded code blocks, and updating the decoding history. In addition, the method can include reconstructing the transport block from a concatenation of code blocks that are successfully decoded after the first transmission and code blocks that are successfully decoded from decoding the first subset of the second plurality of encoded code block. Further, the method can include transmitting an acknowledgement message based on the decoding history.

In an embodiment, to error detect the decoded code blocks, the method can include cyclic redundancy code (CRC) checking on the decoded code blocks. Further, the method can include error detecting a reconstructed transport block that includes code blocks decoded from the present retransmission and successfully decoded code blocks from the previous transmissions. In addition, the method can include determining successful/unsuccessful transmissions of the original transport block based on a CRC check of the reconstructed transport block, and transmitting an acknowledgement message based on the CRC check of the reconstructed transport block.

Aspects of the disclosure can provide a user equipment. The user equipment can include a receiving module configured to convert a received signal corresponding to a transmission of a transport block into a plurality of encoded code blocks. Further, the user equipment can include a selective decoder module. The selective decoder module can be configured to decode a first plurality of encoded code blocks corresponding to a first transmission of a transport block, detect errors in the decoded code blocks, store a decoding history of the decoded code blocks, and selectively decode a second plurality of encoded code blocks corresponding to a second transmission of the transport block based on the decoding history.

Further, the selective decoder module can include a controller unit configured to select a first subset of the second plurality of encoded code blocks based on the decoding history, a decoder unit configured to decode the selected first subset of the second plurality of encoded code blocks into decoded code blocks, without decoding a second subset of the second plurality of encoded code blocks, and a tester unit configured to error detect the decoded code blocks.

According to an aspect of the disclosure, the controller can include a memory unit configured to store the decoding history in a bitmap.

Further, the selective decoder module can include a soft bit generator configured to generate soft bits from received signals corresponding to an encoded code block, and the decoder unit is configured to decode a code block from the soft bits.

Additionally, the selective decoder module can include a combiner unit configured to combine the soft bits from the soft bit generator with stored soft bits from previous transmissions. Further, the selective decoder module can include a storage unit configured store the soft bits from previous transmissions. According to the disclosure, the storage unit can further include a main memory unit configured to store the soft bits from previous transmissions, and a cache unit configured to buffer the soft bits between the main memory unit and the combiner unit.

According to an embodiment of the disclosure, due to selective decoding, the main memory unit may store only the soft bits for code blocks that have failed decoding. Once a code block has been successfully decoded, memory space in association with the code block, for example, storing the soft bits for decoding the code block, can be freed.

To reduce chip area, the main memory unit can be implemented as an external memory unit. To improve processing speed, the selective decoder module can be pipelined.

According to the disclosure, the tester unit can include a code block test engine configured to error detect a decoded code block, a transport block test engine configured to error detect a plurality of decoded code block that are concatenated. In addition, the selective decoder module may include a concatenation unit configured to concatenate code blocks that are successfully decoded from the first transmission and code blocks that are decoded from the first subset of the second plurality of encoded code blocks.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
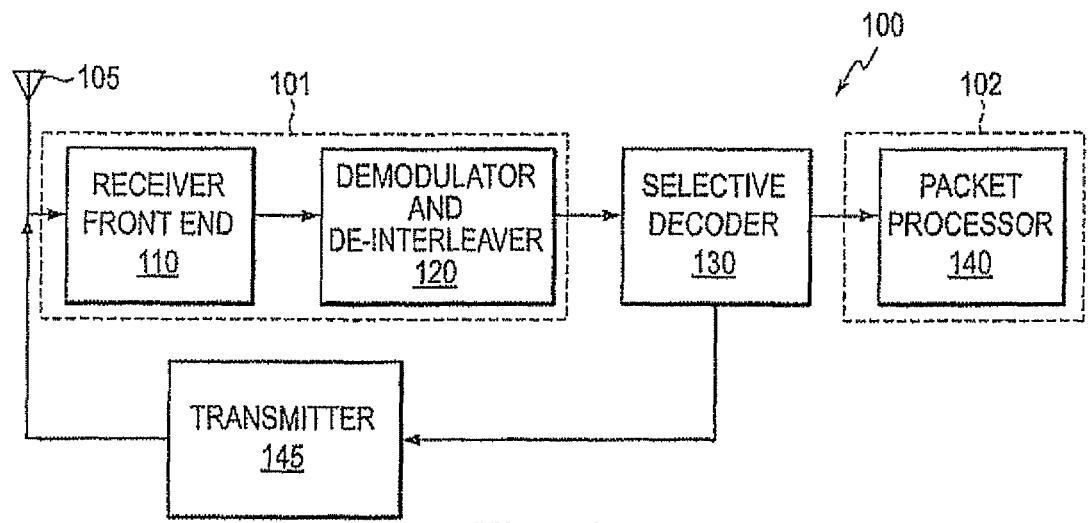
FIG. 1 shows a block diagram of a user equipment example.

FIG. 1 shows a block diagram of a wireless user equipment example 100 according to an embodiment of the disclosure. The wireless user equipment 100 may include an antenna module 105, a receiving module 101, a selective decoder module 130, a processor module 102, and a transmitter module 145. These elements can be coupled together as shown in FIG. 1.

The antenna module 105 may receive various signals in the air, such as radio frequency signals, and the like. The radio frequency signals may carry various information, such as control information, user data, and the like. The antenna module 105 can convert the various signals into electrical signals, and provide the electrical signals to the receiving module 101 for processing. In addition, the antenna module 105 can be coupled to the transmitter module 145, and transmit electromagnetic signals in the air according to the electrical signals provided by the transmitter module 145.

The receiving module 101 can receive electrical signals, extract transport blocks from the electrical signals, and provided the transport blocks to the selective decoder 130. The receiving module 101 may further include various components. In an embodiment, the receiver module 101 may include a receiver front end module 110, a demodulator and de-interleaver module 120.

The receiver front end module 110, such as a modem, can receive the electrical signals from the antenna module 105, and can obtain digital samples from the electrical signals. The receiver front end 110 may include various analog circuits, such as amplifier, filter, down-converter, analog-to-digital converter (ADC), and the like, to process the electrical signals. The digital samples can be provided to the demodulator and de-interleaver module 120 in the form of one or more digital data streams.

The demodulator and de-interleaver module 120 may receive a digital data stream from the receiver front end module 110 and demodulate and de-interleave the digital data stream to obtain transport blocks directed to the wireless user equipment. Then, the transport blocks can be sent to the selective decoder 130.

The selective decoder module 130 can selectively decode a received transport block, which are error detection encoded before transmission, and recover the original transport block. More specifically, a received transport block may include a plurality of encoded code blocks that are concatenated into an encoded transport block. The plurality of encoded code blocks can be selectively decoded into code blocks by the selective decoder module 130 based on a decoding history of the code blocks. Then, the decoded code blocks can be concatenated to recover the original transport block.

In an example, the selective decoder module 130 may receive a first encoded transport block corresponding to an original transport block being transmitted for a first time. The first encoded transport block may include a first plurality of encoded code blocks. The first plurality of encoded code blocks may respectively correspond to code blocks in the transport block. The selective decoder module 130 can decode the first encoded transport block, more specifically decode the first plurality of the encoded code blocks into decoded code blocks, and to test whether the decoded code blocks have errors. Further, the selective decoder module 130 may store a decoding history that can indicate which code blocks of the transport block have been successfully decoded, in other words the decoded code blocks are error free, and which code blocks have failed decoding, in other words the decoded code blocks have errors.

Then, the selective decoder module 130 may receive a second encoded transport block corresponding to the original transport block being transmitted for a second time. The second transport block can include a second plurality of encoded code blocks. The second plurality of encoded code blocks can respectively map the first plurality of encoded code blocks with regard to the code blocks of the original transport block. In an embodiment, the second plurality of encoded code blocks can be the same as the first plurality of encoded code blocks. In another embodiment, the second plurality of encoded code blocks can be different from the first plurality of encoded code blocks. For example, an encoded code block in the second plurality of encoded code blocks can correspond to a same code block of the transport block as an encoded code block in the first plurality of encoded code blocks, but they can be differently encoded, such as using different encoding technique, different coding rates, and the like. The selective decoder module 130 can select a subset of the second plurality of encoded code blocks based on the decoding history, and decode the selected subset of the second plurality of encoded code blocks into decoded code blocks. In an embodiment, the selective decoder module 130 may decode a combination of the selected subset of the second plurality of encoded code blocks and the corresponding encoded code blocks in the first plurality of encoded code blocks. Further, the selective decoder module 130 may test whether the decoded code blocks of the subset have errors, and may update the decoding history.

Therefore, in accordance with an embodiment, the selective decoder module 130 can save resources, such as computing power, memory storage, by not redundantly decoding a portion of the second plurality of encoded code blocks, which have been successfully decoded at the first time.

In an example, the selective decoder module 130 may only store data in association with a code block from previous transmissions if the code block has not been successfully decoded from previous transmissions. Once the code block has been successfully decoded, memory space that stores the data in association with the code block can be freed.

In another example, the selective decoder module 130 may store soft bits in association with a code block from previous transmissions if the code block has not been successfully decoded from previous transmission. Additionally, the selectively decoder module 130 may store data, such as decoded bits, testing data from previous transport block testing, for example, testing data by using segmental cyclic redundancy code (CRC) approach, and the like, in association with a code block from previous transmissions if the code block has been successfully decoded from previous transmission. The stored data in association with the successfully decoded code block can generally consume a reduced storage space compared to the storage space for storing the soft bits in association with the unsuccessfully decoded code block, and can facilitate, for example, transport block testing on a transport block that includes decoded code blocks from both previous transmissions and present transmission. For example, a transport block tester may use the stored testing data in association with code blocks that have been successfully decoded in the previous transmissions in a transport block testing for a new transport block that includes newly decoded code blocks from the present transmission and the code blocks that have been successfully decoded in the previous transmissions.

According to the disclosure, after the selectively decoder module 130 have successfully decoded all the code blocks, the decoded code blocks can be concatenated into a recovered transport block. The recovered transport block can be provided to the processor module 102 for further processing.

The processor module 102 may include various components to further process the transport block. For example, the processor module 102 may include a packet processor 104 to further process at the packet level.

The transmitter 145 may transmit various data and control information. For example, the transmitter 145 can be coupled to the selective decoder 130 to transmit acknowledgement based on decoding results. In particular, when a transport block is not recovered, the selective decoder module 130 may instruct the transmitter 145 to transmit an NACK signal, thus the original transport block can be retransmitted. On the other hand, when the transport block is successfully decoded and recovered, the selective decoder module 130 may instruct the transmitter 150 to transmit an ACK signal, thus the original transport block does not need to be retransmitted.

Figure 2:
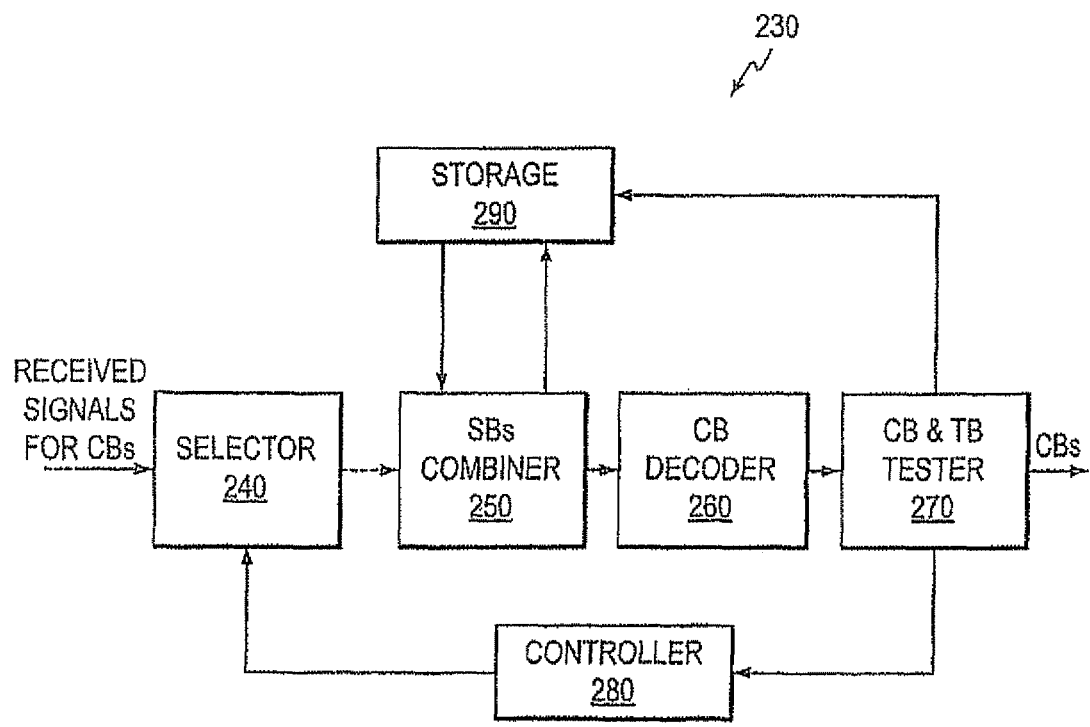
FIG. 2 shows a block diagram of a selective decoder example.

FIG. 2 shows a block diagram of a selective decoder example 230. The selective decoder 230 can include a selector unit 240, a combiner unit 250, a decoder unit 260, a tester unit 270, a controller unit 280, and a storage unit 290. These elements can be coupled together as shown in FIG. 2.

The selective decoder 230 can receive signals corresponding to a transmission of an original transport block. For example, the selective decoder 230 may receive soft values corresponding to a transmission of an original transport block. The original transport block can be transmitted in the form of a plurality of encoded code blocks. Thus, the selective decoder 230 may receive soft values corresponding to the plurality of encoded code blocks. The selectively decoder 230 can selectively decode the plurality of encoded code blocks based on a decoding history of previous transmissions of the original transport block. Further, the selective decoder 230 can concatenate successfully decoded code blocks, which may be decoded from signals received from different transmissions, to recover the transport block. For example, some decoded code blocks can be successfully decoded after a first transmission, and some decoded code blocks can be successfully decoded after a second transmission. The recovered transport block can be provided to an upper layer processing module, for example, a packet processor module.

The selector unit 240 can receive the soft values for the plurality of encoded code blocks. The selector unit 240 can select a portion of the soft values corresponding to a subset of the plurality of encoded code blocks based on a decoding history of previous transmissions of the original transport block. More specifically, in the FIG. 2 example, the selector unit 240 may receive the decoding history from the controller 280. The decoding history may indicate which code blocks of the original transport block have been successfully decoded from previous transmissions, and which code blocks have not been successfully decoded from previous transmission, in other words, have failed error detection test. The selector unit 240 may select soft values corresponding to a subset of the plurality of encoded code blocks that their corresponding decoded code blocks from previous transmissions have failed error detection test. Then, the soft values of the selected subset of the plurality of encoded code blocks can be further processed, such as decoded, and error detected.

In an embodiment, the selector unit 240 may include a soft bit generator (not shown). The soft bit generator may generate soft values, for example, in the form of soft bits, from the received signals before selection.

The soft values are also known as log likelihood ratios. The soft value for a received bit can be interpreted as a measure of reliability for determining the received bit. In an example, the soft value L for the received bit r can be calculated by Eq. 1:

$$L(r) = \ln\left[\frac{\text{possibility for } r = 1}{\text{possibility for } r = 0}\right] \quad \text{Eq. 1}$$

Thus, a large positive L can indicate a high reliability that r is binary one; a large negative L can indicate a high reliability that r is binary zero; and a value near zero can indicate that a decision about r is unreliable.

The combiner unit 250 can combine soft bits of an encoded code block with stored soft bits of corresponding encoded code blocks from previous transmissions. In the FIG. 2 example, the combiner 250 may fetch the stored soft bits from the storage unit 290, and combine the fetched soft bits with the soft bits from the selector 240. Further, the combined soft bits can be provided to the decoder unit 260 for decoding. In addition, the combiner unit 250 can provide the combined soft bits to the storage unit 290 for storing.

The decoder unit 260 can decode the encoded code block based on the soft bits. The decoder unit 260 may use any suitable techniques or algorithms. The decoded code block can be provided to the tester unit 270.

The tester unit 270 can detect whether a decoded code block has been successfully decoded to recover a code block of the original transport block, and can also detect whether an encoded transport block has been successfully decoded to recover the transport block. In an example, the tester unit 270 may include a code block test engine and a transport block test engine. The code block test engine can perform code block error detection test to test whether a code block is successfully decoded, more specifically can detect errors in the decoded code block. The transport block test engine can perform transport block error detect test to test whether the original transport block has been successfully recovered, more specifically can detect errors in concatenated code blocks that have been decoded. In an example, the code block test engine and the transport block test engine can be configured to detect errors according to cyclic redundancy code (CRC) error detection techniques.

In an embodiment, when a code block is successfully decoded, the tester unit 270 can provide the code block to the upper layer processing module, such as a packet processor module, for further processing. In addition, the tester unit 270 may inform the controller 280 to update the decoding history for the code block. When errors are detected in the decoded code block, the corresponding code blocks is not successfully recovered, and the tester unit 270 can inform the storage unit 290 to store the combined soft bits for the code block. The tester unit 270 can also inform the controller 280 to update the decoding history for the code block.

In another embodiment, the decoded code blocks can be provided to the upper layer processing module before the tester unit 270 performs the error detection tests. The decoded code blocks can be concatenated to form a transport block before the error detection tests. When the tester unit 270 receives a newly decoded code block from the decoder unit 260, the newly decoded code block may overwrite a corresponding decoded code block from previous transmissions to form a new transport block. The tester unit 270 may suitably adjust a test sequence of the code block test engine and the transport block test engine. In an example, the transport block test engine may perform test on the new transport block before the code block test engine performs test on the newly decoded code block. Further, the new transport block may be considered as being successfully recovered when the new transport block passes the transport block error detection test, even though not all the decoded code blocks can pass the code block error detection test.

When the original transport block has been successfully recovered, the recovered transport block can be further processed by upper processing layers. In addition, the tester unit 270 may inform the controller 280 to update the decoding history. The controller 280 may initiate an action for transmitting an ACK signal. When the transport block is not successfully recovered, the tester unit 270 can inform the controller 280 to update the decoding history. The controller unit 280 may initiate an action for transmitting an NACK message, which may result a retransmission of the original transport block.

The storage unit 290 can store combined soft bits from previous transmissions. In an embodiment, the storage unit 290 may include a cache unit (not shown), and a main memory unit (not shown). The cache unit may buffer soft bits of a code block, which are calculated from previous transmissions and can be stored in the main memory unit. The soft bits can be provided to the combiner unit 250. In addition, the cache unit may buffer combined soft bits output from the combiner unit 250. Further, the storage unit 290 may receive information from the tester unit 270. When the tester unit 270 informs that a decoded code block fails the code block engine test, the cache unit may send the combined soft bits for the decoded code block to the main memory unit.

According to an aspect of the disclosure, the cache unit can be implemented on a same chip along with various processing units, such as 240-280, and thus can be accessed with fast speed, for example, partially due to close coupling. On the other hand, the main memory unit can be implemented as an external memory, which may be located on a different chip, such as a memory chip, from the various processing units 240-280, which may be located in a baseband chip, for example. Thus, the baseband chip can have a reduced silicon area. In addition, appropriate manufacturing technologies may be respectively chosen for manufacturing the memory chip and the baseband chip separately, for example, to maximize respective performance and/or yield. It is noted that the storage unit may include suitable memory management components that can manage the data transition between the cache unit and the main memory unit.

The controller unit 280 may manage the decoding history for a plurality of code blocks of the transport block, more specifically the controller unit 280 may generate and update the decoding history. Further, the controller unit 280 can control the operations of the selective decoder 230 based on the decoding history.

During operation, the selective decoder 230 may receive a first encoded transport block corresponding to a first time transmission of an original transport block. The first encoded transport block may include a first plurality of encoded code blocks. The first plurality of encoded code blocks may correspond to a plurality of code blocks of the transport block that need to be recovered. The controller unit 280 may generate a decoding history for the plurality of code blocks, and may initiate to a default value. Further, the controller unit 280 can control the selector unit 240 to select the first plurality of encoded code blocks based on the decoding history, in this case, all the encoded code blocks, generate soft bits for the plurality of encoded code blocks, and provide the soft bits to the combiner unit 250. The combiner unit 250 can provide the soft bits to the decoder unit 260, and the cache unit in the storage 290. The decoder unit 260 can decode the first plurality of encoded code blocks into decoded code blocks, and provide the decoded code blocks to the tester unit 270. The tester unit 270 can detect errors in the decoded code blocks. If no error is detected in a decoded code block, the decoded code block recovers a code block of the transport block. The tester unit 270 can send a signal to update the decoding history for the code block, and can provide the recovered code block to an upper layer for processing. On the other hand, if errors are detected in a decoded code block, the tester unit 270 may inform the cache unit in the storage unit 290 to store the soft bits for the code block in the main memory unit.

If there exists a code block that is not successfully recovered, the original transport block can be retransmitted. The selective decoder 230 may receive a second encoded transport block corresponding to a retransmission of the original transport block. The second encoded transport block may include a second plurality of encoded code blocks. The second plurality of encoded code blocks may respectively map the first plurality of encoded code blocks. The controller unit 280 can control the selector unit 240 to select a subset of the second plurality of encoded code blocks based on the decoding history. The selector unit 240 may generate soft bits for the selected subset of encoded code blocks, and provide the soft bits to the combiner unit 250. On the other hand, the cache unit in the storage unit 290 may buffer stored soft bits from the main memory unit, and provide the soft bits to the combiner unit 250. The combiner unit 250 can combine the stored soft bits with the soft bits from the selector unit 240. The combiner unit 250 can provide the combined soft bits to the decoder unit 260 and the cache unit in the storage 290. The decoder unit 260 can decode the combined soft bits to obtain decoded code blocks, and provide the decoded code blocks to the tester unit 270. The tester unit 270 can detect errors in the decoded code blocks. If no error is detected in a decoded code block, the decoded code block recovers a code block. The tester unit 270 can send a signal to update the decoding history for the code block, and can provide the recovered code block to the upper layer for processing. In addition, the tester unit 270 may signal the cache unit to release this code block from caching, without storing the combined soft bits for the code black in the main memory unit. On the other hand, if errors are detected in a decoded code block, the tester unit 270 may inform the cache unit in the storage unit 290 to store the combined soft bits for the code block in the main memory unit.

When all the code blocks have been successfully recovered, the code blocks can be concatenated. The tester unit 270 may further test if the concatenated code blocks successfully recover the transport block. When the transport block is recovered, it can be provided to the upper layer for further processing, and an ACK message can be transmitted to inform no more retransmission is needed.

It is noted that the tester unit 270 may suitably adjust the sequence of applying the code block error detection test, applying the transport block error detection test, and providing decoding results to the upper layer. For example, the test unit 270 may first provide a newly decoded code block to the upper layer to form a new transport block, then the test unit 270 may apply the transport block error detection test on the new transport block. Further, if the transport block error detection test fails, the test unit 270 may apply the code block error detection test on the newly decoded code block. On the other hand, according to an embodiment of the disclosure, if the transport block error detection test passes, the new transport block can be considered as being successfully recovered, even though there may exist decoded code blocks that may not pass the code block error detection test.

Figure 3:
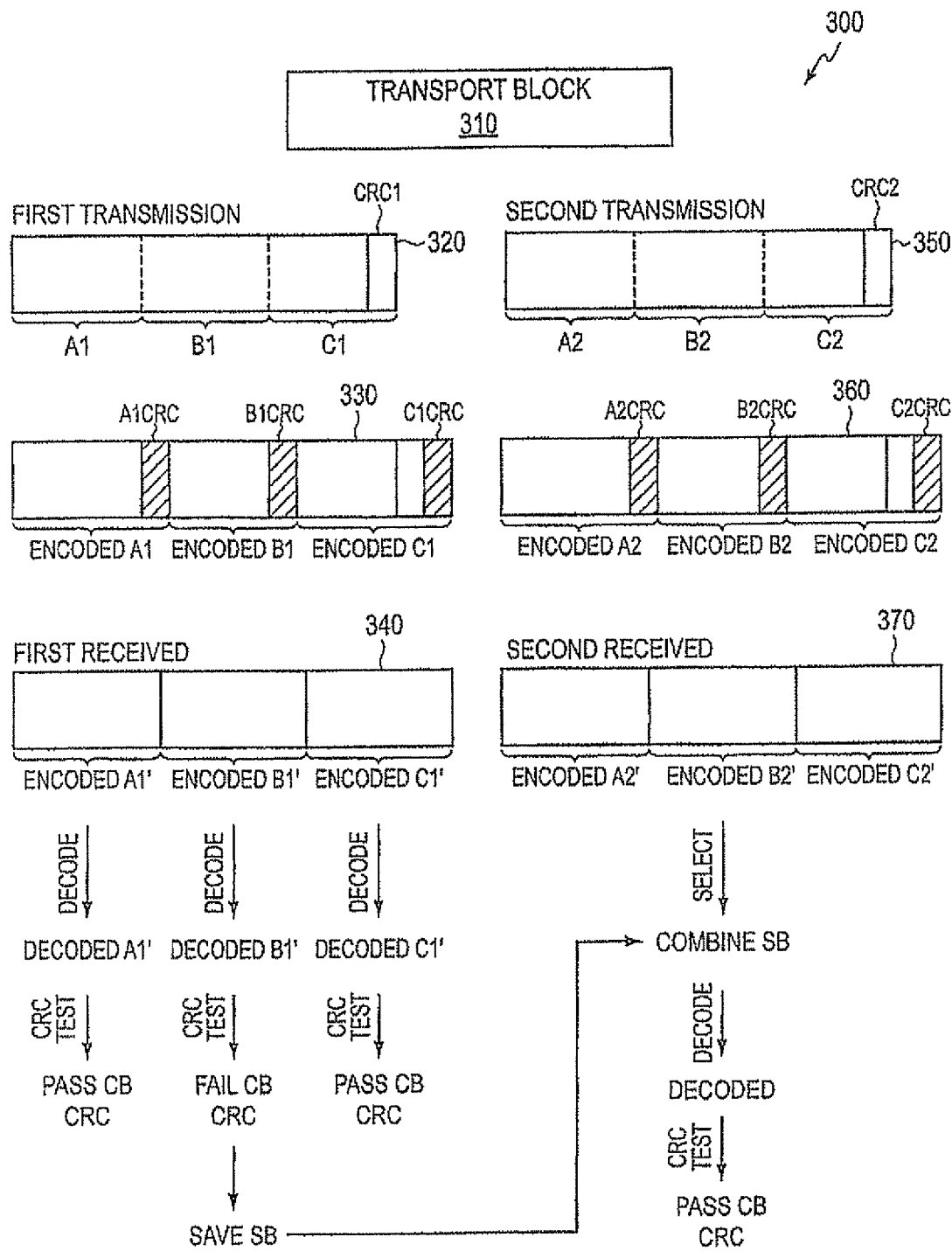
FIG. 3 shows an illustration of a selective decoding example.

FIG. 3 shows an illustration of a selective decoding example. A user equipment may receive multiple transmissions corresponding to an original transport block 310, such as a first transmission and a second transmission in FIG. 3. In some embodiments, the second transmission may be transmitted responsively to the receipt of an NACK indicating that one or more of the code blocks in the first transmission was faultily decoded. The original transport blocks 310 can include any communication information, such as control information, user data information, and the like.

During the first transmission, the original transport block 310 can be encoded according to various techniques, such as forward error correction (FEC) coding technique, cyclic redundancy code (CRC) error detection technique, and the like. In the FIG. 3 example, the original transport block 310 can be encoded according to the CRC error detection technique, and a CRC remainder, shown as CRC1, can be appended to the original transport block to form a first CRC appended transport block 320. Further, the first CRC appended transport block 320 can be split into a plurality of code blocks, such as A1-C1 in FIG. 3.

Additionally, the plurality of code blocks A1-C1 can be respectively encoded according various techniques to form encoded code blocks. In the FIG. 3 example, the code blocks A1-C1 can be encoded according to the CRC error detection technique respectively. Thus, code block remainders, shown as A1CRC, B1CRC, and C1CRC, can be appended to the code blocks A1-C1, to form encoded A1, encoded B1, and encoded C1. Further, the encoded A1-C1 can be concatenated into an encoded transport block 330 for the first transmission.

The receiver of the user equipment can receive an encoded transport block 340 corresponding to the encoded transport block 330 in the first transmission. The encoded transport block 340 can include a plurality of encoded code blocks corresponding to the encoded code blocks in the transmitted transport block 330, respectively. In the FIG. 3 example, the encoded transport block 340 can include encoded code blocks, such as encoded A1', B1' and C which can correspond to the encoded A1, B1 and C1, respectively. The encoded A1'-C1' can be decoded respectively to obtain decoded A1'-C1'. Further, decoded A1'-C1' may be error detected to test whether they have been successfully decoded, in other words, corresponding code blocks can be recovered. In the FIG. 3 example, the decoded A1' and decoded C1' may pass the code block CRC error detection test, and decoded B1' may fail the code block CRC error detection test, which means code blocks A1 and C1 can be recovered, while code block B1 can not be recovered from the first transmission. The test results can be stored in a decoding history. In an example, the decoding history may include a bit-map that can be stored in a memory. Each bit in the bit-map may correspond to a code block and a value of the bit can indicate a decoding status, such as binary one for failure, and binary zero for success. When a code block is successfully recovered, the recovered code block (CB) can be output to an upper layer for further processing; on the other hand, when a code block is not recovered, soft bits (SB) for the code block can be stored. If there exists a code block that has not been recovered successfully, in accordance with an embodiment, the entire original transport block can be retransmitted. In an embodiment, an NACK message can be sent to initiate the second transmission of the entire original transport block.

During the second transmission, the original transport block 310 can be encoded in a same way as the first transmission, or in a different way from the first transmission. For example, the transport block 310 can be encoded according to the same CRC error detection technique, but with different parameters, such as different coding rates, and the like. Thus, a different CRC remainder, shown as CRC2, can be appended to the transport block 310 to form a second CRC appended transport block 350. Further, the second CRC appended transport block 350 can be split into a plurality of code blocks, such as A2-C2 in FIG. 3. The plurality of code blocks A2-C2 may map the plurality of code blocks A1-C1, respectively. In the FIG. 3 example, A2 can be the same as A1, B2 can be the same as B1, and C2 can include same or different CRC remainder from C1.

Additionally, the plurality of code blocks A2-C2 can be respectively encoded according to various techniques to form encoded A2-C2. It is noted that the plurality of code blocks A2-C2 can be encoded in the same way as in the first transmission, or can be encoded in a different way from the first transmission. In an example, the code blocks A2-C2 can be encoded according to the CRC error detection technique as in the first transmission, but may use different parameters, such as different coding rates, and the like. Thus, different CRC remainders, shown as A2CRC, B2CRC, and C2CRC in FIG. 3, can be appended to code blocks A2-C2, to form encoded A2-C2. Further, the encoded A2-C2 can be concatenated into an encoded transport block 360 for the second transmission.

The receiver of the user equipment can receive an encoded transport block 370 corresponding to the encoded transport block 360 in the second transmission. The encoded transport block 370 can include a plurality of received encoded code blocks corresponding to the encoded code blocks in the second transmission. In the FIG. 3 example, the received transport block 370 can include encoded A2'-C2', which can correspond to the encoded code blocks A2-C2, respectively.

Further, the selective decoder in the user equipment, such as 230, can selectively decode the encoded A2'-C2' according to the decoding history. In FIG. 3 example, the decoding history indicates that decoded B1' has failed the CRC error detection test. Thus, the encoded B2' can be selected, and decoded. In an embodiment, the encoded B2' can be combined with corresponding data, such as soft bits, from previous transmissions and then decoded. In the FIG. 3 example, soft bits of the encoded B2' can be generated, and can be combined with the stored soft bits of the encoded Br. Then, the combined soft bits can be decoded to obtain a decoded code block. Further, a CRC error detection test can be applied to the decoded code block. In the FIG. 3 example, the decode code block may pass the CRC error detection test, which means B2 can be recovered. Thus, all the code blocks of the original transport block 310 are successfully recovered. The code blocks that were successfully decoded after the first transmission can be concatenated with the code blocks that were successfully decoded after the second transmission to generate a fully decoded transport block.

The selective decoder can be implemented according to various techniques. For example, the selective decoder can be implemented as software instructions saved in a memory medium, and can be executed by a processor to perform the selective decoding functions. In another example, the selective decoder can be implemented as hardware, such as application specific integrated circuits (ASICs) to improve processing speed. Various techniques can be applied to further improve processing speed, and to efficiently use silicon area.

Figure 4:
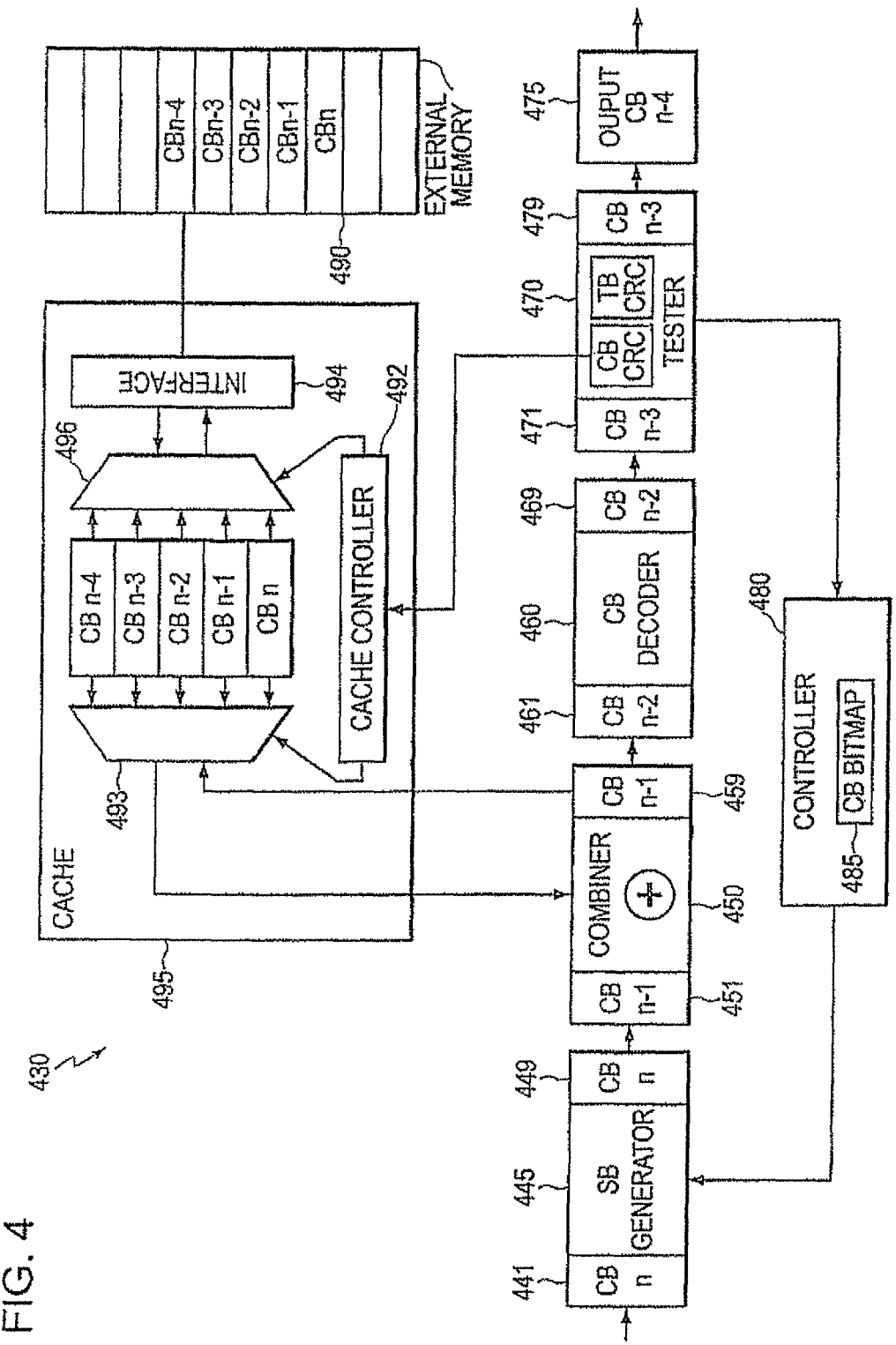
FIG. 4 shows a block diagram of a selective decoder example using a pipeline architecture.

FIG. 4 shows a block diagram of a selective decoder example 430 using a pipeline architecture according to an embodiment of the disclosure. The selective decoder 430 may include a soft bit generator unit 445, a combiner unit 450, a decoder unit 460, a tester unit 470, an output unit 475, a controller unit 480, a cache unit 495, and an external memory unit 490. These elements can be coupled together as shown in FIG. 4.

The soft bit generator unit 445 can receive an encoded code block, and selectively generate soft bits of the encoded code block under controls from the controller 480. The soft bits of the encoded code block can be provided to the combiner unit 450. More specifically, when the encoded code block is received for the first time or the decoding history indicates that the corresponding code block has not been successfully recovered, the soft bit generator unit 445 can generate the soft bits from the encoded code block. When the coding history indicates that the corresponding code block has been successfully recovered, the soft bit generator unit 445 will not generate the soft bits for the encoded code block.

The combiner unit 450 can receive the soft bits for a code block from the soft bits generator unit 445 and can also receive stored soft bits for the code block from previous transmissions from the cache unit 495. The combiner unit 450 can combine soft bits from the soft bit generator unit 445 and the stored soft bits from the cache unit 495. Further, the combiner unit 450 can provide the combined soft bits for the code block to the decoder unit 460. In addition, the combiner unit 450 can also provide the combined soft bits back to the cache unit 495 for caching.

The decoder unit 460 can obtain a decoded code block from the soft bits for the code block. The soft bits can be combined soft bits from multiple transmissions. The decoded code block can be provided to the tester unit 470.

The tester unit 470 can include a code block test engine CB_CRC and a transport block test engine TB_CRC. The code block test engine CB_CRC can test whether a code block is successfully recovered from a decoded code block, and the transport block test engine TB_CRC can test whether a transport block has been successfully recovered. When a code block is successfully recovered, the tester unit 470 can provide the code block to the output unit 475 to output to an upper layer. In addition, the tester unit 470 may inform the controller 480 to update the decoding history for the code block. When the decoded code block has errors, which means the code block is not successfully recovered, the tester unit 470 can inform the storage unit 490 to store the combined soft bits for the code block.

When the transport block passes the transport test engine test, which means the transport is successfully recovered, the tester unit 470 can provide the recovered transport block to the upper layer for further processing. In addition, the tester unit 470 may inform the controller 480 to update the decoding history. The controller 480 may initiate an action to transmit an ACK message. When the transport block has not been successfully recovered, the tester unit 470 can inform the controller 480 to update the decoding history. The controller unit 480 may initiate an action to transmit an NACK message, which may result a retransmission of the original transport block.

The cache unit 495 may cache soft bits for code blocks. The cache unit 495 may include a plurality of memory units, a cache controller 492, and an interface 494 to the external memory unit 490. The cache unit 495 can fetch soft bits for code blocks from the external memory unit 490 via the interface 494, buffer the soft bits, and provide the soft bits to the combiner 450. On the other hand, the cache unit 495 may buffer combined soft bits for a code block from the combiner 450, and may store the buffered soft bits to the external memory if a decoded code block from buffered soft bits failed code block error detection test.

The controller 480 can include a decoding history for code blocks, such as a code block bit map 485. The controller 480 can manage the decoding history. More specifically, the controller 480 may initiate a decoding history when a first transmission of a transport block is received for a first time, and may update the decoding history when a code block of the transport block is not recovered. Further, the controller 480 may control the soft bits generator 445 to selectively generate soft bits based on the decoding history. The controller 480 may be coupled to a transmitter to instruct the transmitter to transmit acknowledge messages based on the decoding history.

The external memory 490 can be implemented on a different integrated circuit (IC) chip, such as a memory IC chip, from the rest of the selective decoder 430, which may be on a processor IC chip. Thus, the processor IC chip may have a reduced silicon area. Each of the processor IC ship and the memory IC chip may respectively choose suitable design and manufacturing technology, for example, to maximum respective performance, and yield. In an embodiment, the external memory 490 may be organized according to the code block structure to simplify memory address decoding, for example.

The soft bit generator unit 445, the combiner unit 450, the decoder unit 460, the tester unit 470, and the output buffer unit 475 can be configured in a pipeline architecture, in order to improve processing speed. In the FIG. 4 example, each unit in the pipeline architecture can include an input buffer to buffer inputs for a code block from a previous unit and an output buffer to buffer processed outputs for the code block to output to a next unit. Thus, the units in the pipeline architecture may operate on different code blocks in parallel.

FIG. 4 shows a snap shot example of the pipeline architecture. At a time, the soft bits generator unit 445 may operate on code block CBn, the combiner unit 450 may operate on code block CBn-1, the decoder unit 460 may operate on code block CBn-2, the tester 470 may operate on code block CBn-3, and the output unit 475 may operate on CBn-4.

Figure 5:
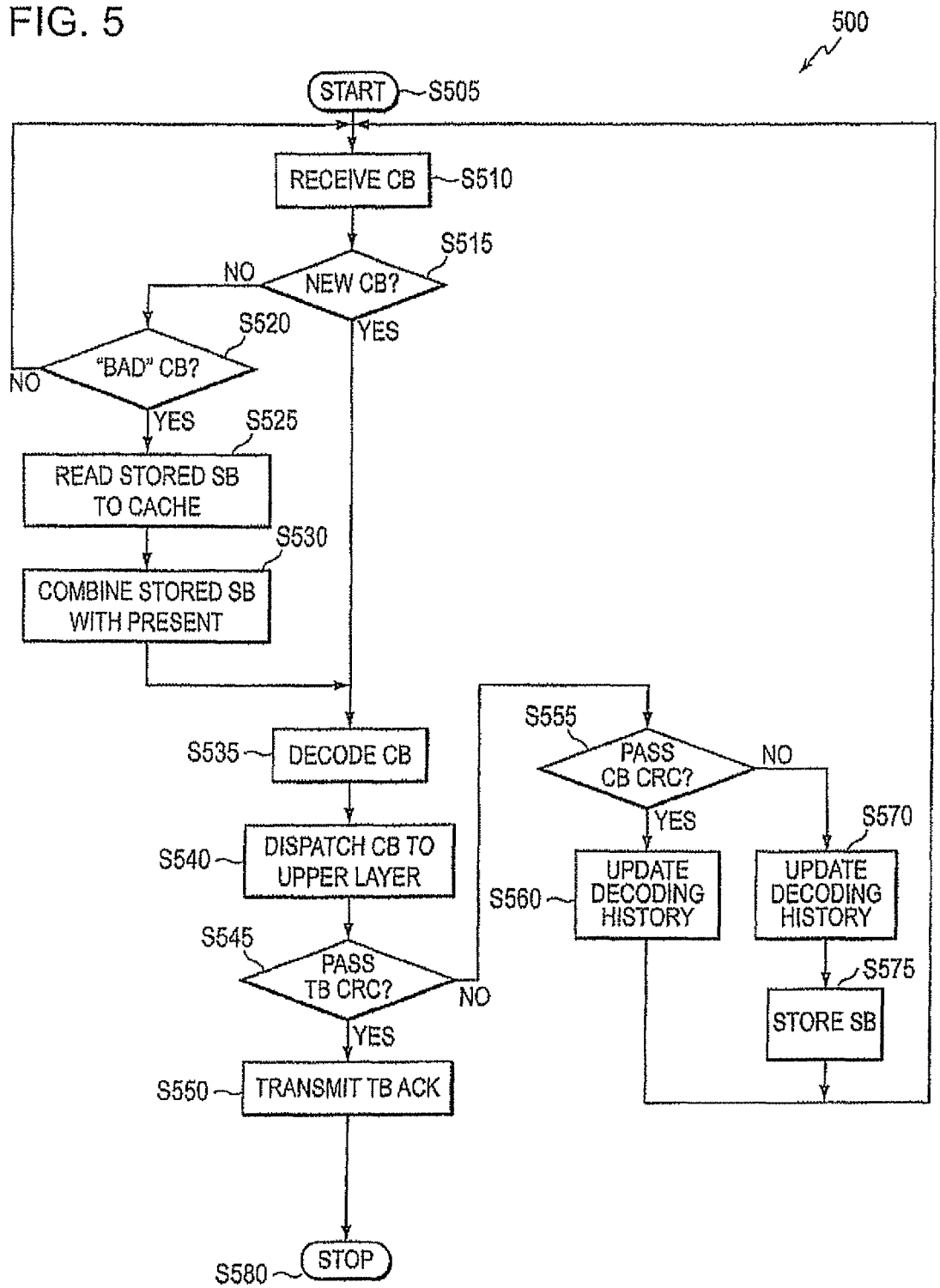
FIG. 5 shows a flowchart outlining a process example for selective decoding.

FIG. 5 shows a flowchart outlining a process example for a selective decoder to selectively decode an encoded transport block that is received by the selective decoder according to an embodiment of the disclosure. The encoded transport block may correspond to a transmission of an original transport block, and the encoded transport block can include a plurality of encoded code blocks that are concatenated. The process starts at step S505, and proceeds to step S510.

In step S510, the selective decoder may receive an encoded code block. Then, the process proceeds to step S515.

In step S515, the selective decoder may determine whether the encoded code block is "new". In an example, the selective decoder may determine whether the encoded code block corresponds to a first transmission of the transport block or a retransmission of the transport block. When the encoded code block is "new", in other words, corresponds to the first transmission, the process proceeds to step S535; otherwise, the process proceeds to step S520.

In step S520, the selective decoder may determine whether the encoded code block is "bad". In other words, the selective decoder may determine whether corresponding code block has been successfully recovered from previous transmissions. In an example, the selective decoder may check a decoding history, for example a bitmap for code blocks, that may indicate decoding status of the code blocks from previous transmissions. When the encoded code block is "bad", which means the corresponding code block has not been successfully recovered from previous transmissions, the process proceeds to step S525; otherwise, the process returns to step S510 to receive a next encoded code block.

In step S525, the selective decoder may fetch stored soft bits from previous transmissions to cache. Then, the process proceeds to step S530.

In step S530, the selective decoder may combine soft bits from present transmission and the stored soft bits from previous transmissions. Then, the process proceeds to step S535.

In step S535, the selective decoder may decode a code block based on soft bits of the present transmission in the "new" encoded code block case, and based on the combined soft bits in the "bad" encoded code block case. Then, the process proceeds to step S540.

In step S540, the selective decoder may dispatch the decoded code block to an upper communication layer, such as a packet processor. The decoded code block may replace a corresponding dispatched code block from previous transmissions, for example, in the "bad" encoded code block case. Then, the process proceeds to step S545.

In step S545, the selective decoder may determine whether the transport block has been successfully decoded, considering the just decoded code block. In an example, the selective decoder may apply a transport block CRC error detection test. If the transport block CRC error detection test is passed, the process proceeds to step S550, otherwise, the process proceeds to step S555.

In step S550, the selective decoder may transmit an ACK message to acknowledge a successful receipt and decoding of the original transport block. Then, the process proceeds to step S580 and terminates.

In step S555, the selective decoder may determine whether the decoded code block can recover the corresponding code block. In an example, the selective decoder may apply a code block CRC error detection test on the decoded code block. When the decoded code block passes the test, the process proceeds to step S560; otherwise, the process proceeds to step S570.

In step S560, the selective decoder may update the decoding history, such as a bitmap for the code blocks. Then, the process returns step S510 to receive a next encoded code block.

In step S570, the selective decoder may update decoding history. Then, the process proceeds to step S575.

In step S575, the selective decoder may store the soft bits for future decoding of the code block. In an embodiment, the selective decoder may check if the code block is the last code block in the transport block in step S575. When the code block is the last code block in the transport block, the selective decoder may send a NACK message to initiate a retransmission of the original transport block. In another embodiment, the retransmission may be initiated if no ACK message has been received by the source of the transport block for a time interval. Then, the process returns to S510 to receive a next encoded code block.

While the invention has been described in conjunction with the specific embodiments thereof that are proposed as examples, it is evident that many alternatives, modifications, and variations will be apparent to those skilled in the art. Accordingly, embodiments of the disclosure as set forth herein are intended to be illustrative, not limiting. There are changes that may be made without departing from the spirit and scope of the invention.

What is claimed is:

1. A method for decoding a data stream in a wireless device, comprising:
    receiving a first plurality of encoded code blocks corresponding to a first transmission of a transport block;
    decoding the first plurality of encoded code blocks into decoded code blocks;
    error detecting the decoded code blocks;
    storing a decoding history of the decoded code blocks;
    receiving a second plurality of encoded code blocks corresponding to a retransmission of the transport block, the second plurality of encoded code blocks corresponding to the first plurality of encoded code blocks respectively; and
    selectively decoding a first subset of the second plurality of encoded code blocks, without decoding a second subset of the second plurality of encoded code blocks, based on the decoding history.

2. The method according to claim 1, wherein the second plurality of encoded code blocks had been encoded identically as the first plurality of encoded code blocks.

3. The method according to claim 1, wherein the second plurality of encoded code blocks had been encoded differently as the first plurality of encoded code blocks.

4. The method according to claim 1, wherein storing the decoding history of the decoded code blocks further comprises:
    storing a bitmap corresponding to the error detection for the decoded code blocks.

5. The method according to claim 1, wherein selectively decoding the first subset of the second plurality of encoded code blocks based on the decoding history, further comprises:
selecting an encoded code block from the second plurality of encoded code blocks if the decoding history indicates that decoding for the code block in previous transmissions failed.

6. The method according to claim 5, wherein selectively decoding the first subset of the second plurality of encoded code blocks based on the decoding history, further comprises:
decoding a combination of the selected encoded code block and its corresponding code blocks from previous transmissions.

7. The method according to claim 6, wherein decoding the combination of the selected encoded code block and its corresponding code blocks from previous transmissions, further comprises:
combining soft bits of the selected encoded code block with soft bits from previous transmissions; and
decoding the combined soft bits into a decoded code block.

8. The method according to claim 7, further comprising:
storing the combined soft bits if the decoded code block fails an error detecting test.

9. The method according to claim 1, further comprising:
error detecting the decoded code blocks from decoding the first subset of the second plurality of encoded code blocks;
updating the decoding history; and
reconstructing the transport block from a concatenation of code blocks that are successfully decoded after the first transmission and code blocks that are successfully decoded from decoding the first subset of the second plurality of encoded code blocks.

10. The method according to claim 1, further comprising:
transmitting an acknowledgement message based on the decoding history.

11. A user equipment, comprising:
a receiving module configured to receive a first plurality of encoded code blocks corresponding to a first transmission of a transport block and to receive a second plurality of encoded code blocks corresponding to a retransmission of the transport block, the second plurality of encoded code blocks corresponding to the first plurality of encoded code blocks respectively; and
a decoder module configured to decode the first plurality of encoded code blocks into decoded code blocks, detect errors in the decoded code blocks, store a decoding history of the decoded code blocks in a storage, and to decode selectively a first subset of the second plurality of encoded code blocks, without decoding a second subset of the second plurality of encoded code blocks, based on the decoding history.

12. The user equipment according to claim 11, wherein the second plurality of encoded code blocks had been encoded identically as the first plurality of encoded code blocks.

13. The user equipment according to claim 11, wherein the second plurality of encoded code blocks had been encoded differently as the first plurality of encoded code blocks.

14. The user equipment according to 11, wherein the storage is configured to store a bitmap corresponding to the error detection for the decoded code blocks.

15. The user equipment according to claim 11, wherein the decoder module is further configured to select an encoded code block from the second plurality of encoded code blocks if the decoding history indicates that decoding for the code block in previous transmissions failed.

16. The user equipment according to claim 15, wherein the decoder module is further configured to decode a combination of the selected encoded code block and its correspondents from previous transmissions.

17. The user equipment according to claim 16, the decoder module is further configured to combine soft bits of the selected encoded code block with soft bits from previous transmissions and to decode the combined soft bits into a decoded code block.

18. The user equipment according to claim 17, the decoder module is further configured to store the combined soft bits if the decoded code block fails an error detecting test.

19. The user equipment according to claim 11, the decoder module is further configured to detect error in the decoded code blocks from decoding the first subset of the second plurality of encoded code blocks, update the decoding history, and to reconstruct the transport block from a concatenation of code blocks that are successfully decoded after the first transmission and code blocks that are successfully decoded from decoding the first subset of the second plurality of encoded code blocks.

20. The user equipment according to claim 11, further comprising:
a transmitter configured to transmit an acknowledgement message based on the decoding history.

* * * * *